J. Hoyt,
Drag Saw,
N°58,726.
Patented Oct. 9, 1866.
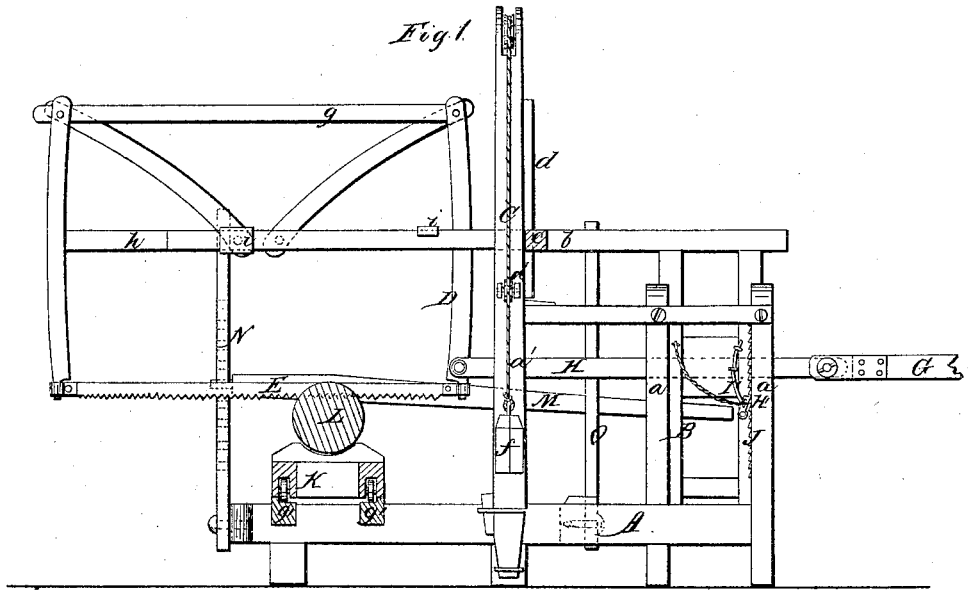
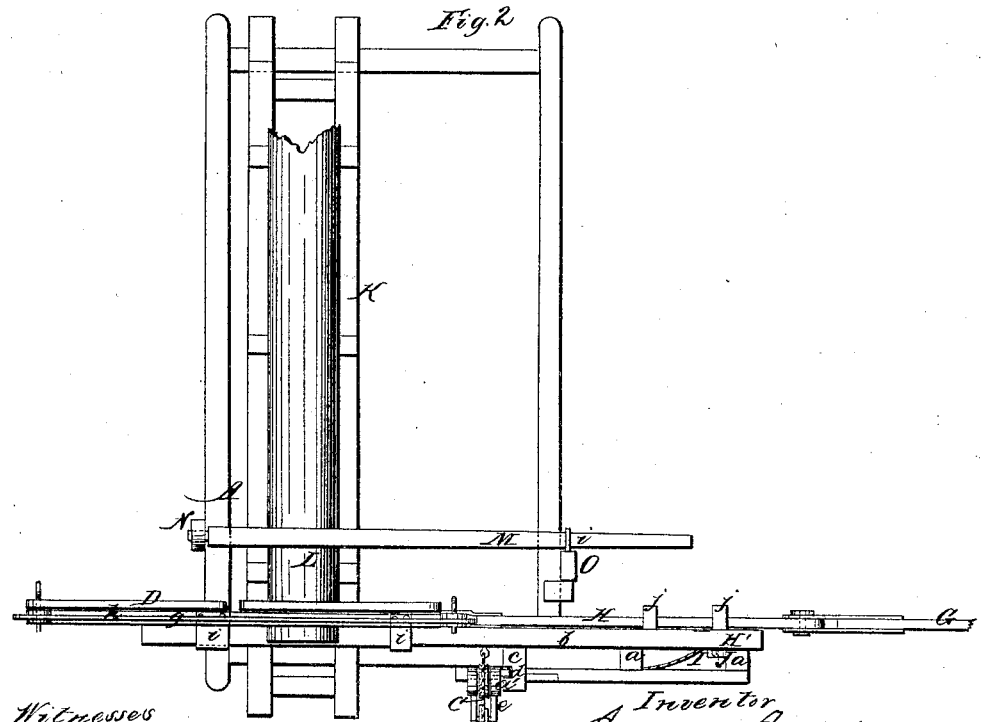

UNITED STATES PATENT OFFICE.

JEROME HOYT, OF STAMFORD, CONNECTICUT, ASSIGNOR TO HIMSELF, EDWIN HOYT, AND LAFAYETTE FARRINGTON, OF SAME PLACE.

IMPROVEMENT IN SAWING-MACHINES.

Specification forming part of Letters Patent No. 58,726, dated October 9, 1866.

*To all whom it may concern:*

Be it known that I, JEROME HOYT, of Stamford, in the county of Fairfield and State of Connecticut, have invented a new and Improved Sawing-Machine; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a plan or top view of the same.

Similar letters of reference indicate like parts.

This invention relates to a new and improved machine for sawing wood transversely with the grain, such as are commonly termed "cross-cut" sawing-machines, and chiefly used for sawing wood for fuel.

The invention consists in having the saw-frame fitted on a movable guide-frame, provided with a counterpoise, and arranged as hereinafter shown and described, whereby the work may be done very expeditiously.

The invention also consists in an improved clamp for clamping the log on the carriage and holding both the log and carriage in position while the log is being sawed.

A represents a horizontal frame, at one end of which there are three uprights, $a$ $a$ $a'$, the uprights $a$ $a$ being grooved vertically at their inner sides, and serving as guides for an upright sliding frame, B, the top bar, $b$, of which is of considerable length, and has an arm, $c$, projecting laterally from it at right angles, and grooved or notched at one side to work on a guide, $d$, attached to the upright $a'$. This top bar, $b$, of the frame B has a cord or rope, C, connected to it, which passes over a pulley, $e$, in the top of the upright $a'$, and extends down by the side of a pulley, $d$, in an arm, $e$, projecting from the upright $a'$, and has a weight, $f$, at its lower end to serve as a counterpoise.

D represents a saw-frame, in the lower part of which the saw E is secured and strained by means of a bar, $g$, at the upper end of the frame, similar to the way in which an ordinary hand-saw is strained. The center bar, $h$, of this saw-frame is provided with guides $i$ $i$, which are fitted on the top bar, $b$, of the frame B, to admit of the saw-frame working freely back and forth on bar $h$. The saw-frame has a bar, F, attached to it, which works through guides $j$ $j$ on the frame B, and the outer end of bar F has a pitman, G, connected to it, which is driven by any convenient power. By this means a reciprocating motion is given the saw-frame D, and the teeth of the saw E have an upright pitch, so as to cut while moving in both directions.

To the frame B there is attached a pawl, H', having a spring, I', bearing against it, which keeps the pawl engaged with a rack, J, secured to one of the uprights $a$. By means of this pawl and rack the frame B and saw are prevented from casually rising, the saw being kept down to its mark and still allowed to feed itself to its work by its own gravity in connection with that of the frames B D, the weight $f$ serving to counteract a too heavy pressure of the saw on the log.

K is a carriage, which is fitted and allowed to slide freely upon ways $g'$ $g'$ on the frame A, said carriage moving in a direction at right angles with the saw. On this carriage K the log L to be sawed is placed, and is secured by a clamp formed of a bar, M, one end of which is fitted in any of a series of holes in an upright, N, attached to frame A, and the other end fitted under a pin, $i$, in an upright bar, O, also attached to frame A. This forms a very simple clamp, and one which admits of the log being readily secured and released.

Having thus described my invention, what I claim as new, and desire to secure by Letters Patent, is—

In sawing-machines, the combination of the grooved uprights $a$ $a$, sliding frame B, saw-frame D, guides $i$ $j$, spring-pawl H', and rack J, when arranged and operating substantially as described, for the purpose specified.

The above specification of my invention signed by me this 9th day of March, 1866.

JEROME HOYT.

Witnesses:
 M. M. LIVINGSTON,
 ALEX. F. ROBERTS.